US012148265B2

(12) United States Patent
Huke et al.

(10) Patent No.: US 12,148,265 B2
(45) **Date of Patent: *Nov. 19, 2024**

(54) METHODS, SYSTEMS, AND APPARATUSES FOR ROLLING PLAYS IN A POSSESSION WAGER

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 137 days.

This patent is subject to a terminal disclaimer.

(21) Appl. No.: 17/883,187

(22) Filed: Aug. 8, 2022

(65) Prior Publication Data

US 2022/0383691 A1 Dec. 1, 2022

Related U.S. Application Data

(63) Continuation of application No. 17/480,508, filed on Sep. 21, 2021, now Pat. No. 11,410,493.

(60) Provisional application No. 63/115,746, filed on Nov. 19, 2020.

(51) Int. Cl.
*G07F 17/32* (2006.01)
*G06Q 50/34* (2012.01)

(52) U.S. Cl.
CPC ........... *G07F 17/323* (2013.01); *G06Q 50/34* (2013.01); *G07F 17/3211* (2013.01); *G07F 17/3288* (2013.01)

(58) Field of Classification Search
None
See application file for complete search history.

(56) References Cited

U.S. PATENT DOCUMENTS

| | | | |
|---|---|---|---|
| 10,016,674 B2 | 7/2018 | Paradise | |
| 10,872,503 B2 | 12/2020 | Huke | |
| 2008/0153588 A1 | 6/2008 | Muir et al. | |
| 2019/0295382 A1 | 9/2019 | Huke et al. | |
| 2022/0130201 A1* | 4/2022 | Huke | G07F 17/3288 |
| 2022/0139151 A1* | 5/2022 | Huke | G07F 17/323 463/25 |
| 2022/0165115 A1* | 5/2022 | Huke | G06F 16/2457 |

* cited by examiner

*Primary Examiner* — Ronald Laneau
(74) *Attorney, Agent, or Firm* — Maier & Maier, PLLC

(57) ABSTRACT

The present disclosure provides a method to create new wagers and optimize odds in an online play by play sports betting game by creating odds for the beginning of an offensive possession for what the offensive possession will result in, allowing the user to wager on one or more of the offensive possession results wager odds, then after a play concludes create new wagering odds for the continuation of the offensive possession for the next possible outcomes of the play and allow the user to wager on the new or old wagering odds for what the offensive possession will result in.

9 Claims, 3 Drawing Sheets

A system for rolling plays in a drive wager

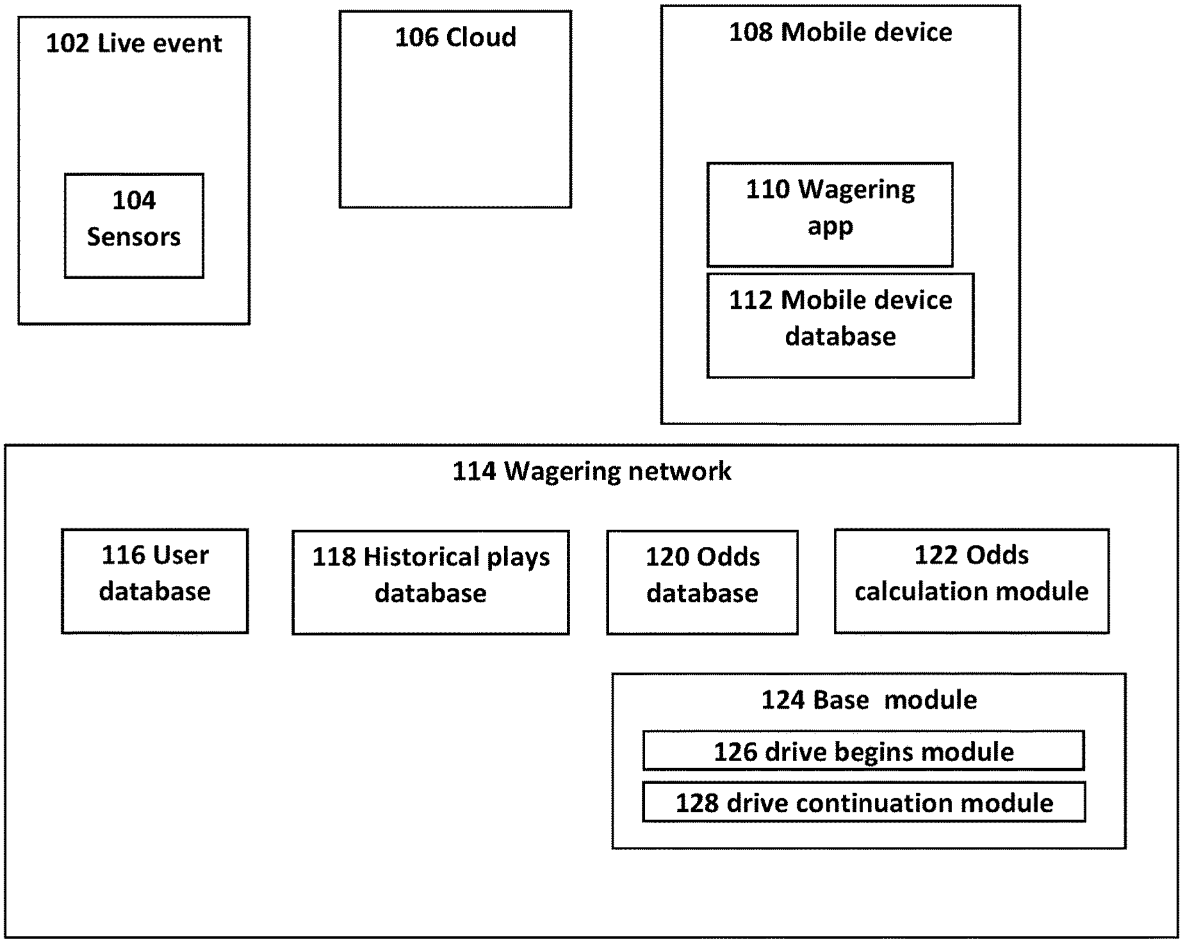
Fig.1 A system for rolling plays in a drive wager

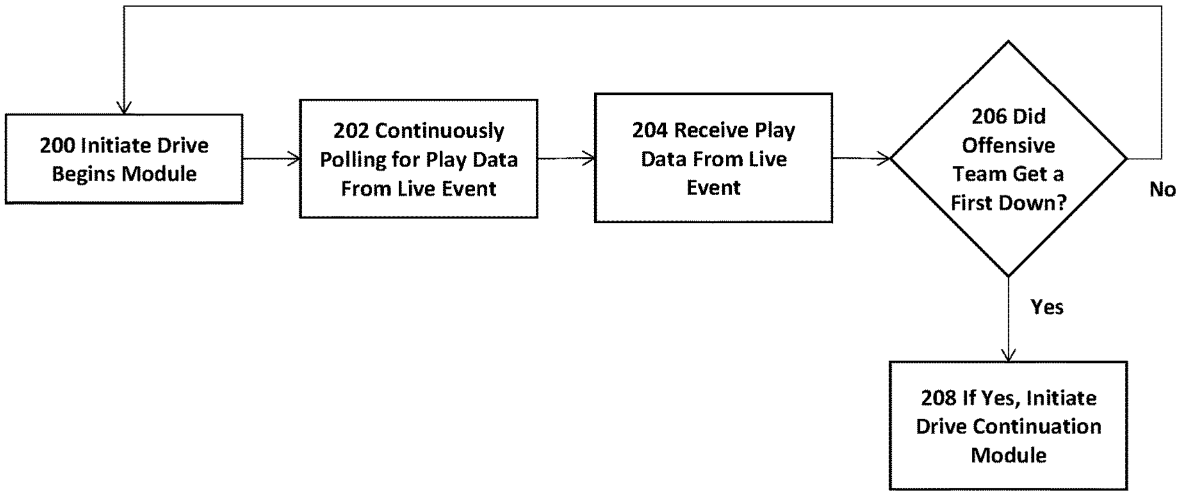
Fig.2 Base Module
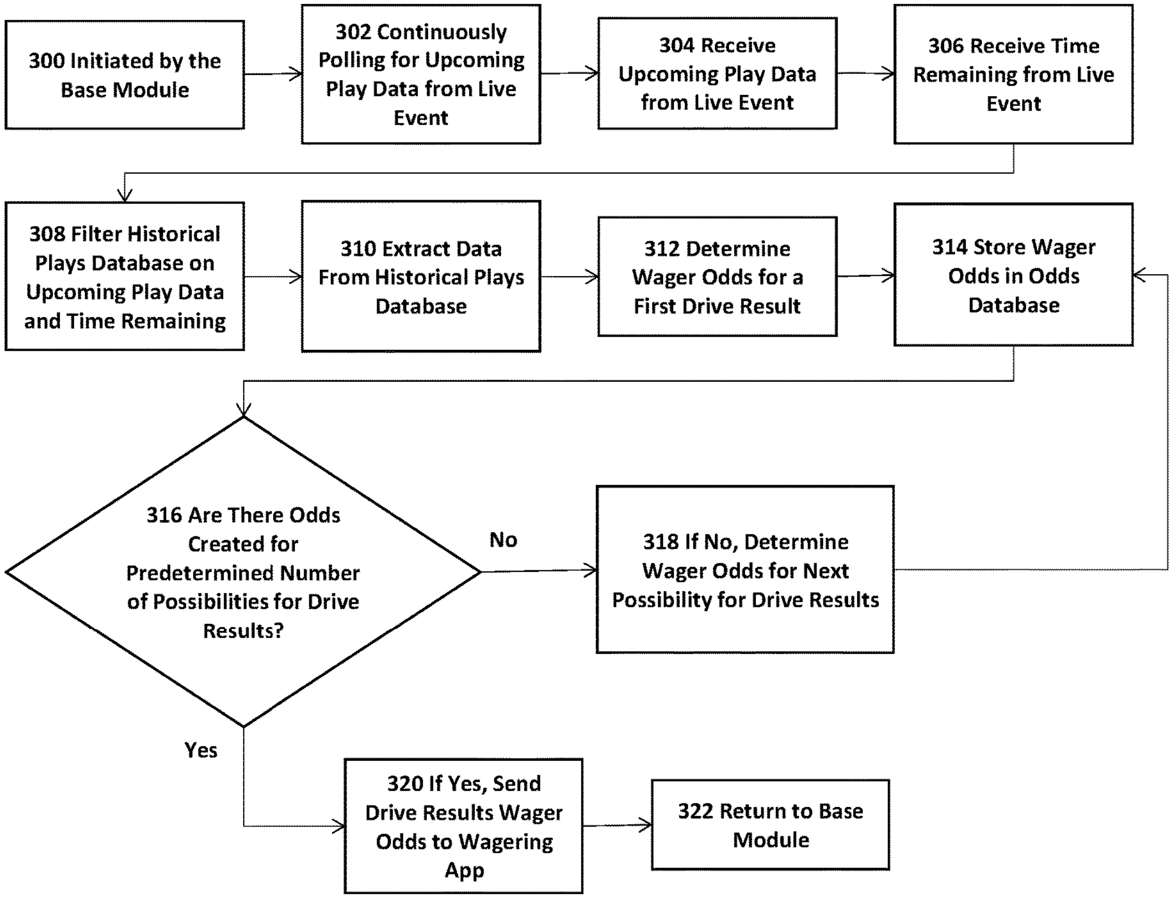
Fig.3 Drive Begins Module

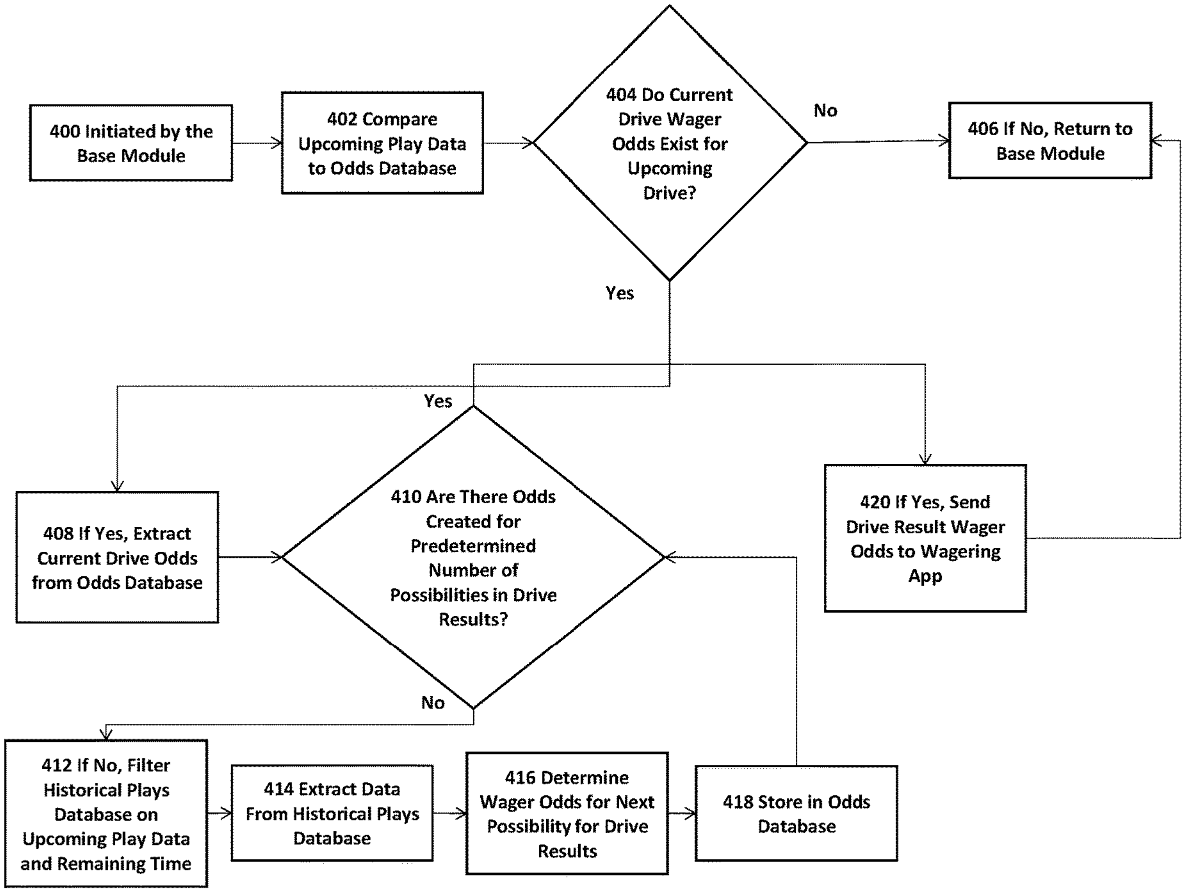
Fig.4 Drive Continuation Module

METHODS, SYSTEMS, AND APPARATUSES FOR ROLLING PLAYS IN A POSSESSION WAGER

CROSS-REFERENCE TO RELATED APPLICATIONS

The present patent application is a U.S. Continuation Application of U.S. Utility patent application Ser. No. 17/480,508, file on Sep. 21, 2021, which claims benefit and priority to U.S. Provisional Patent Application No. 63/115,746 entitled "ROLLING PLAYS IN A DRIVE WAGERS" filed on Nov. 19, 2020 the disclosures of which are hereby incorporated by reference.

FIELD

The present disclosures are generally related to in-play wagering on live sporting events.

BACKGROUND

Currently, users have limited options for wagering on potential outcomes of current drives in a football event on wagering applications and wagering platforms.

Also, if users can wager on outcomes of specific plays or drive results, they are limited because the wager odds are not updated based upon the outcome of the previous plays.

Lastly, there is currently no method to have rolling drive or possession wager odds constantly updated from a play-by-play standpoint.

Thus, there is a need within the prior art to offer users rolling drive result wager odds for outcomes on each play that is continuously updated.

SUMMARY

Methods, systems, and apparatuses for generating and transmitting odds on a wagering network. In one embodiment, a method to generate wagers and optimize odds on a sport wagering network includes determining at least one set of wagering odds for at least one upcoming event using historical play data; determining at least a predetermined number of wager odd possibilities for at least a possession wager or a possession result; determining if at least a team is continuing to play offense in an event; determining if at least a set of possession wager odds or a set of possession result odds are available; and sending at least a predetermined number of wager odd possibilities for at least a possession wager or a possession result to a wagering application.

In another embodiment, a system to generate wagers and optimize odds on a sport wagering network can include a base module; a possession begins module; a possession continuation module; a graphical display; wherein the base module is configured to initiate the possession begins module, continuously poll for at least play data from a live event, receive at least play data from the live event, determine if at least a team is still playing offense in the live event, and initiate the possession continuation module; the possession begins module is configured to continuously poll for at least upcoming play data from a live event, receive at least upcoming play data and time remaining from the live event, filter a historical plays database for at least upcoming play data and time remaining, extract at least historical play data from the historical plays database, determine at least wager odds for at least a first possession result, store at least wager odds in an odds database, determine if there are odds for at least a predetermined number of possibilities for at least a possession result, and send at least a possession result to a wagering application; the possession continuation module is configured to compare at least upcoming play data with an odds database, determine if at least a current set of possession wager odds exist, determine if there are wager odds for at least a predetermined number of possibilities for at least a possession result, filter a historical plays database for at least upcoming play data and time remaining, extract at least historical play data from the historical plays database, determine at least wager odds for at least a next possibility for a possession result, store at least a set of wager odds in an odds database; and send at least a possession result to a wagering application.

BRIEF DESCRIPTIONS OF THE DRAWINGS

The accompanying drawings illustrate various embodiments of systems, methods, and various other aspects of the embodiments. Any person with ordinary art skills will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1: illustrates a system for rolling plays in a drive or possession wager, according to an embodiment.

FIG. 2: illustrates a base module, according to an embodiment.

FIG. 3: illustrates a drive begins module, according to an embodiment.

FIG. 4: illustrates a drive continuation module, according to an embodiment.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word exemplary means serving as an example, instance or illustration. The embodiments described herein are not limiting, but rather are exemplary only. The described embodiments are not necessarily to be construed as preferred or advantageous over other embodiments. Moreover, the terms embodiments of the invention, embodiments, or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that specific circuits can perform the various sequence of actions described herein (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in several different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, and/or hit performed by a participant in a sporting event. In some embodiments, an action may be a strategic decision made by a participant in the sporting event, such as a player, coach, management, etc. In some embodiments, an action may be a penalty, foul, or other type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity based on the outcome of a future event, such as the results of a game or event. It may be understood that non-monetary items may be the subject of a "bet" or "wager" as well, such as points or anything else that can be quantified for a "bet" or "wager." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be made for certain amount or for a future time. A "bet" or "wager" can be made for being able to answer a question correctly. A "bet" or "wager" can be made within a certain period. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain to place bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example, up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sportsbook has reduced its betting limits, usually because of weather or the uncertain status of injured players, is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides," "favorite," "chalk," "circled game," "laying the points price," "dog," and "underdog" can be integrated into the embodiments in a variety of manners.

The "money line" refers to the odds expressed in terms of money. With money odds, whenever there is a minus (−), the player "lays" or is "laying" that amount to win (for example, $100); where there is a plus (+), the player wins that amount for every $100 wagered. A "straight bet" refers to an individual wager on a game or event that will be determined by a point spread or money line. The term "straight-up" means winning the game without any regard to the "point spread," a "money-line" bet. "Money line," "straight bet," and "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread." A handicap of the "point spread" value is given to the favorite team so bettors can choose sides at equal odds. "Cover the spread" means that a favorite wins an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread." The "opening line" means the earliest line posted for a particular sporting event or game. The term "pick" or "pick 'em" refers to a game when neither team is favored in an event or game. "Line," "cover the spread," "cover," "tie," "pick," and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules in an electronically powered domain for the purpose of recreation or instruction. “eSports” refers to a form of sports competition using video games, or a multiplayer video game played competitively for spectators, typically by professional gamers. Digital gaming and “eSports” can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. The event can be integrated into the embodiments in a variety of manners.

The “total” is the combined number of runs, points or goals scored by both teams during the game, including overtime. The “over” refers to a sports bet in which the player wagers that the combined point total of two teams will be more than a specified total. The “under” refers to bets that the total points scored by two teams will be less than a certain figure. “Total,” “over,” and “under” can be integrated into the embodiments in a variety of manners.

A “parlay” is a single bet that links together two or more wagers; to win the bet, the player must win all the wagers in the “parlay.” If the player loses one wager, the player loses the entire bet. However, if they win all the wagers in the “parlay,” the player may receive a higher payoff than if the player had placed the bets separately. A “round robin” is a series of parlays. A “teaser” is a type of parlay in which the point spread, or total of each individual play is adjusted. The price of moving the point spread (teasing) is lower payoff odds on winning wagers. “Parlay,” “round robin,” “teaser” can be integrated into the embodiments in a variety of manners.

A “prop bet” or “proposition bet” means a bet that focuses on the outcome of events within a given game. Props are often offered on marquee games of great interest. These include Sunday and Monday night pro football games, various high-profile college football games, major college bowl games, and playoff and championship games. An example of a prop bet is “Which team will score the first touchdown?” “Prop bet” or “proposition bet” can be integrated into the embodiments in a variety of manners.

A “first-half bet” refers to a bet placed on the score in the first half of the event only and only considers the first half of the game or event. The process in which you go about placing this bet is the same process that you may use to place a full game bet, but as previously mentioned, only the first half is important to a first-half bet type of wager. A “half-time bet” refers to a bet placed on scoring in the second half of a game or event only. “First-half-bet” and “half-time-bet” can be integrated into the embodiments in a variety of manners.

A “futures bet” or “future” refers to the odds that are posted well in advance on the winner of major events. Typical future bets are the Pro Football Championship, Collegiate Football Championship, the Pro Basketball Championship, the Collegiate Basketball Championship, and the Pro Baseball Championship. “Futures bet” or “future” can be integrated into the embodiments in a variety of manners.

The “listed pitchers” is specific to a baseball bet placed only if both pitchers scheduled to start a game start. If they do not, the bet is deemed “no action” and refunded. The “run line” in baseball refers to a spread used instead of the money line. “Listed pitchers,” “no action,” and “run line” can be integrated into the embodiments in a variety of manners.

The term “handle” refers to the total amount of bets taken. The term “hold” refers to the percentage the house wins. The term “juice” refers to the bookmaker’s commission, most commonly the 11 to 10 bettors lay on straight point spread wagers: also known as “vigorish” or “vig”. The “limit” refers to the maximum amount accepted by the house before the odds and/or point spread are changed. “Off the board” refers to a game in which no bets are being accepted. “Handle,” “juice,” vigorish,” “vig,” and “off the board” can be integrated into the embodiments in a variety of manners.

“Casinos” are a public room or building where gambling games are played. “Racino” is a building complex or grounds having a racetrack and gambling facilities for playing slot machines, blackjack, roulette, etc. “Casino” and “Racino” can be integrated into the embodiments in a variety of manners.

Customers are companies, organizations or individuals that may deploy, for fees, and may be part of, or perform, various system elements or method steps in the embodiments.

Managed service user interface service is a service that can help customers (1) manage third parties, (2) develop the web, (3) perform data analytics, (4) connect thru application program interfaces and (4) track and report on player behaviors. A managed service user interface can be integrated into the embodiments in a variety of manners.

Managed service risk management service are services that assist customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling, and (4) customer service assistance. These managed service compliance services can be integrated into the embodiments in a variety of manners.

Managed service pricing and trading service is a service that helps customers with (1) official data feeds, (2) data visualization, and (3) land based on property digital signage. These managed service pricing and trading services can be integrated into the embodiments in a variety of manners.

Managed service and technology platforms are services that help customers with (1) web hosting, (2) IT support, and (3) player account platform support. These managed service and technology platform services can be integrated into the embodiments in a variety of manners.

Managed service and marketing support services are services that help customers (1) acquire and retain clients and users, (2) provide for bonusing options, and (3) develop press release content generation. These managed service and marketing support services can be integrated into the embodiments in a variety of manners.

Payment processing services are services that help customers with (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat players to free bets, odds boosts, enhanced access, and flexible cash-back to boost lifetime value. Engaging promotions can be integrated into the embodiments in a variety of manners.

“Cash out” or “pay out” or “payout” allow customers to make available, on singles bets or accumulated bets with a partial cash out where each operator can control payouts by always managing commission and availability. The "cash out" or "pay out" or "payout" can be integrated into the embodiments in a variety of manners, including both monetary and non-monetary payouts, such as points, prizes, promotional or discount codes, and the like.

"Customized betting" allows customers to have tailored personalized betting experiences with sophisticated tracking and analysis of players' behavior. "Customized betting" can be integrated into the embodiments in a variety of manners.

Kiosks are devices that offer interactions with customers, clients, and users with a wide range of modular solutions for both retail and online sports gaming. Kiosks can be integrated into the embodiments in a variety of manners.

Business Applications are an integrated suite of tools for customers to manage the everyday activities that drive sales, profit, and growth by creating and delivering actionable insights on performance to help customers to manage the sports gaming. Business Applications can be integrated into the embodiments in a variety of manners.

State-based integration allows for a given sports gambling game to be modified by states in the United States or other countries, based upon the state the player is in, mobile phone, or other geolocation identification means. State-based integration can be integrated into the embodiments in a variety of manners.

Game Configurator allows for configuration of customer operators to have the opportunity to apply various chosen or newly created business rules on the game as well as to parametrize risk management. The Game Configurator can be integrated into the embodiments in a variety of manners.

"Fantasy sports connectors" are software connectors between method steps or system elements in the embodiments that can integrate fantasy sports. Fantasy sports allow a competition in which participants select imaginary teams from among the players in a league and score points according to the actual performance of their players. For example, if a player in fantasy sports is playing at a given real-time sport, odds could be changed in the real-time sports for that player.

Software as a service (or SaaS) is a software delivery and licensing method in which software is accessed online via a subscription rather than bought and installed on individual computers. Software as a service can be integrated into the embodiments in a variety of manners.

Synchronization of screens means synchronizing bets and results between devices, such as TV and mobile, PC, and wearables. Synchronization of screens can be integrated into the embodiments in a variety of manners.

Automatic content recognition (ACR) is an identification technology that recognizes content played on a media device or present in a media file. Devices containing ACR support enable users to quickly obtain additional information about the content they see without any user-based input or search efforts. A short media clip (audio, video, or both) is selected to start the recognition. This clip could be selected from within a media file or recorded by a device. Through algorithms such as fingerprinting, information from the actual perceptual content is taken and compared to a database of reference fingerprints, wherein each reference fingerprint corresponds with a known recorded work. A database may contain metadata about the work and associated information, including complementary media. If the media clip's fingerprint is matched, the identification software may return the corresponding metadata to the client application. For example, during an in-play sports game, a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet"—which is a computer-generated data point—is placed above the player that is bet on. Augmented reality can be integrated into the embodiments in a variety of manners.

Some embodiments of this disclosure, illustrating all its features, will now be discussed in detail. It can be understood that the embodiments are intended to be open-ended in that an item or items used in the embodiments is not meant to be an exhaustive listing of such item or items or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for rolling plays in a drive or possession wager. This system may include a live event 102, for example, a sporting event such as a football, basketball, baseball, or hockey game, tennis match, golf tournament, eSports, or digital game, etc. The live event 102 may include some number of actions or plays, upon which a user, bettor, or customer can place a bet or wager, typically through an entity called a sportsbook. There are numerous types of wagers the bettor can make, including, but not limited to, a straight bet, a money line bet, or a bet with a point spread or line that the bettor's team may need to cover if the result of the game with the same as the point spread the user may not cover the spread, but instead the tie is called a push. If the user bets on the favorite, points are given to the opposing side, which is the underdog or longshot. Betting on all favorites is referred to as chalk and is typically applied to round-robin or other tournaments' styles. There are other types of wagers, including, but not limited to, parlays, teasers, and prop bets, which are added games that often allow the user to customize their betting by changing the odds and payouts received on a wager. Certain sportsbooks will allow the bettor to buy points which moves the point spread off the opening line. This increases the price of the bet, sometimes by increasing the juice, vig, or hold that the sportsbook takes. Another type of wager the bettor can make is an over/under, in which the user bets over or under a total for the live event 102, such as the score of an American football game or the run line in a baseball game, or a series of actions in the live event 102. Sportsbooks have several bets they can handle, limiting the number of wagers they can take on either side of a bet before they will move the line or odds off the opening line. Additionally, there are circumstances, such as an injury to an important player like a listed pitcher, in which a sportsbook, casino, or racino may take an available wager off the board. As the line moves, an opportunity may arise for a bettor to bet on both sides at different point spreads to middle, and win, both bets. Sportsbooks will often offer bets on portions of games, such as first-half bets and half-time bets. Additionally, the sportsbook can offer futures bets on live events in the future. Sportsbooks need to offer payment processing services to cash out customers which can be done at kiosks at the live event 102 or at another location.

Further, embodiments may include a plurality of sensors 104 that may be used such as motion, temperature, or humidity sensors, optical sensors, and cameras such as an RGB-D camera which is a digital camera capable of capturing color (RGB) and depth information for every pixel in an image, microphones, radiofrequency receivers, thermal imagers, radar devices, lidar devices, ultrasound devices, speakers, wearable devices, etc. Also, the plurality of sensors 104 may include but are not limited to, tracking devices, such as RFID tags, GPS chips, or other such devices embedded on uniforms, in equipment, in the field of play and boundaries of the field of play, or on other markers in the field of play. Imaging devices may also be used as tracking devices, such as player tracking, which provide statistical information through real-time X, Y positioning of players and X, Y, Z positioning of the ball.

Further, embodiments may include a cloud 106 or a communication network that may be a wired and/or wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, or other communication techniques that are known in the art. The communication network may allow ubiquitous access to shared pools of configurable system resources and higher-level services that can be rapidly provisioned with minimal management effort, often over the internet, and relies on sharing resources to achieve coherence and economies of scale, like a public utility. In contrast, third-party clouds allow organizations to focus on their core businesses instead of expending resources on computer infrastructure and maintenance. The cloud 106 may be communicatively coupled to a peer-to-peer wagering network 114, which may perform real-time analysis on the type of play and the result of the play. The cloud 106 may also be synchronized with game situational data such as the time of the game, the score, location on the field, weather conditions, and the like, which may affect the choice of play utilized. For example, in an exemplary embodiment, the cloud 106 may not receive data gathered from the sensors 104 and may, instead, receive data from an alternative data feed, such as Sports Radar®. This data may be compiled substantially immediately following the completion of any play and may be compared with a variety of team data and league data based on a variety of elements, including the current down, possession, score, time, team, and so forth, as described in various exemplary embodiments herein.

Further, embodiments may include a mobile device 108 such as a computing device, laptop, smartphone, tablet, computer, smart speaker, or I/O devices. I/O devices may be present in the computing device. Input devices may include but are not limited to, keyboards, mice, trackpads, trackballs, touchpads, touch mice, multi-touch touchpads and touch mice, microphones, multi-array microphones, drawing tablets, cameras, single-lens reflex cameras (SLRs), digital SLRs (DSLRs), complementary metal-oxide semiconductor (CMOS) sensors, accelerometers, IR optical sensors, pressure sensors, magnetometer sensors, angular rate sensors, depth sensors, proximity sensors, ambient light sensors, gyroscopic sensors, or other sensors. Output devices may include but are not limited to, video displays, graphical displays, speakers, headphones, inkjet printers, laser printers, or 3D printers. Devices may include, but are not limited to, a combination of multiple input or output devices such as, Microsoft KINECT, Nintendo Wii remote, Nintendo WII U GAMEPAD, or Apple iPhone. Some devices allow gesture recognition inputs by combining input and output devices. Other devices allow for facial recognition, which may be utilized as an input for different purposes such as authentication or other commands. Some devices provide for voice recognition and inputs including, but not limited to, Microsoft KINECT, SIRI for iPhone by Apple, Google Now, or Google Voice Search. Additional user devices have both input and output capabilities including but not limited to, haptic feedback devices, touchscreen displays, or multi-touch displays. Touchscreen, multi-touch displays, touchpads, touch mice, or other touch sensing devices may use different technologies to sense touch, including but not limited to, capacitive, surface capacitive, projected capacitive touch (PCT), in-cell capacitive, resistive, IR, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, but not limited to, pinch, spread, rotate, scroll, or other gestures. Some touchscreen devices, including but not limited to, Microsoft PIXELSENSE or Multi-Touch Collaboration Wall, may have larger surfaces, such as on a table-top or on a wall, and may also interact with other electronic devices. Some I/O devices, display devices, or groups of devices may be augmented reality devices. An I/O controller may control one or more I/O devices, such as a keyboard and a pointing device, or a mouse or optical pen. Furthermore, an I/O device may also contain storage and/or an installation medium for the computing device. In some embodiments, the computing device may include USB connections (not shown) to receive handheld USB storage devices. In further embodiments, an I/O device may be a bridge between the system bus and an external communication bus, e.g., USB, SCSI, FireWire, Ethernet, Gigabit Ethernet, Fiber Channel, or Thunderbolt buses. In some embodiments, the mobile device 108 could be an optional component and may be utilized in a situation where a paired wearable device employs the mobile device 108 for additional memory or computing power or connection to the internet.

Further, embodiments may include a wagering software application or a wagering app 110, which is a program that enables the user to place bets on individual plays in the live event 102, streams audio and video from the live event 102, and features the available wagers from the live event 102 on the mobile device 108. The wagering app 110 allows the user to interact with the wagering network 114 to place bets and provide payment/receive funds based on wager outcomes.

Further, embodiments may include a mobile device database 112 that may store some or all the user's data, the live event 102, or the user's interaction with the wagering network 114.

Further, embodiments may include the wagering network 114, which may perform real-time analysis on the type of play and the result of a play or action. The wagering network 114 (or the cloud 106) may also be synchronized with game situational data, such as the time of the game, the score, location on the field, weather conditions, and the like, which may affect the choice of play utilized. For example, in an exemplary embodiment, the wagering network 114 may not receive data gathered from the sensors 104 and may, instead, receive data from an alternative data feed, such as SportsRadar®. This data may be provided substantially immediately following the completion of any play and may be compared with a variety of team data and league data based on a variety of elements, including the current down, possession, score, time, team, and so forth, as described in various exemplary embodiments herein. The wagering network 114 can offer several SaaS managed services such as user interface service, risk management service, compliance, pricing and trading service, IT support of the technology platform, business applications, game configuration, state-based integration, fantasy sports connection, integration to allow the joining of social media, or marketing support services that can deliver engaging promotions to the user.

Further, embodiments may include a user database 116, which may contain data relevant to all users of the wagering network 114 and may include, but is not limited to, a user ID, a device identifier, a paired device identifier, wagering history, or wallet information for the user. The user database 116 may also contain a list of user account records associated with respective user IDs. For example, a user account record may include, but is not limited to, information such as user interests, user personal details such as age, mobile number, etc., previously played sporting events, highest wager, favorite sporting event, or current user balance and standings. In addition, the user database 116 may contain betting lines and search queries. The user database 116 may be searched based on a search criterion received from the user. Each betting line may include but is not limited to, a plurality of betting attributes such as at least one of the following: the live event 102, a team, a player, an amount of wager, etc. The user database 116 may include, but is not limited to, information related to all the users involved in the live event 102. In one exemplary embodiment, the user database 116 may include information for generating a user authenticity report and a wagering verification report. Further, the user database 116 may be used to store user statistics like, but not limited to, the retention period for a particular user, frequency of wagers placed by a particular user, the average amount of wager placed by each user, etc.

Further, embodiments may include a historical plays database 118 that may contain play data for the type of sport being played in the live event 102. For example, in American Football, for optimal odds calculation, the historical play data may include metadata about the historical plays, such as time, location, weather, previous plays, opponent, physiological data, etc.

Further, embodiments may utilize an odds database 120—that may contain the odds calculated by an odds calculation module 122—to display the odds on the user's mobile device 108 and take bets from the user through the mobile device wagering app 110.

Further, embodiments may include the odds calculation module 122, which may utilize historical play data to calculate odds for in-play wagers.

Further, embodiments may include a base module 124, which may begin with the base module 124 initiating the drive begins module 126 (which may also be considered as a possession module 126). Then the base module 124 may continuously poll for the upcoming play data from the live event 102. For example, the base module 124 may continuously poll to receive the data from the live event 102 that represents the current state of the live event 102, such as in the New England Patriots vs. New York Jets event is in the second quarter with one minute and 50 seconds remaining, with New England having possession of the ball on the New England 35-yard line with a first down and ten yards to go. Then the base module 124 may receive the upcoming play data from the live event 102. For example, the upcoming play data from the live event 102 that represents the current state of the live event 102 may be the New England Patriots vs. New York Jets event is in the second quarter with one minute and 50 seconds remaining, with New England having possession of the ball on the New England 35-yard line with a first down and ten yards to go. Next, the base module 124 may determine if the offensive team got the first down. For example, the base module 124 may make this determination if the down resets to 1 if the previous down was 1, 2, or 3, or if the same team has retained possession and the ball is placed or set ten yards further than the previous first down. If the team with possession of the ball has changed, for example, if the New England Patriots are no longer the offensive team and the New York Jets are now the offensive team, then the Patriots have failed to achieve a first down. If the offensive team has failed to achieve a first down, then the process may return to initiating the drive begins module 126. Then the base module 124 may initiate the drive continuation module 128. For example, if the New England Patriots have achieved a first down, then the base module 124 may initiate the drive continuation module 128.

Further, embodiments may include a drive begins module 126, which may begin with the base module 124 initiating the drive begins module 126. The drive begins module 126 may continuously poll for the upcoming play data from the live event 102. For example, the drive begins module 126 may continuously poll to receive the data from the live event 102 that represents the current state of the live event 102, such as in the New England Patriots vs. New York Jets event is in the second quarter with two minutes and zero seconds remaining, with New England having possession of the ball on the New England 25-yard line with a first down and ten yards to go. Then the drive begins module 126 may receive the upcoming play data from the live event 102. For example, the upcoming play data from the live event 102 that represents the current state of the live event 102 may be the New England Patriots vs. New York Jets event is in the second quarter, with New England having possession of the ball on the New England 25-yard line with a first down and ten yards to go. Then the drive begins module 126 may receive the time remaining from the live event 102. For example, the time remaining might be two minutes and zero seconds remaining in the second quarter. The drive begins module 126 may filter the historical plays database 118 on the upcoming play data. For example, the historical plays database 118 may be filtered for the New England Patriots vs. the New York Jets, with two minutes remaining on first down at the New England 25-yard line. Then the drive begins module 126, may extract the data from the historical plays database 118. For example, the drive begins module 126 may extract all the historical play data associated with the event being the New England Patriots vs. the New York Jets, with two minutes remaining on first down at the New England 25-yard line. The drive begins module 126 may determine the wager odds. For example, the drive begins module 126 may determine the average wager odds from the odds of the historical wager extracted from the historical plays database 118, such as if the number of times or occasions that the New England Patriots scored a touchdown vs. the New York Jets with two minutes remaining before the end of the first half. For example, if the Patriots had 100 drives versus the New York Jets with two minutes remaining before the end of the first half and out of those 100 drives only five times did the Patriots score a touchdown, then there may only be a 5% chance for the drive to result in a touchdown, which the odds may be 100:5 or displayed to the user as 20:1 odds for the drive to result in a touchdown. Then the drive begins module 126 may store the wager odds in the odds database 122 as drive results. For example, the wager odds 20:1 may be stored in the odds database 122 for the New England Patriots drive to result in a touchdown versus the New York Jets. Then the drive begins module 126 may determine if odds are created for a predetermined number of possibilities for the drive results. For example, there may need to be other odds calculated for the different drive results during the New England Patriots drive versus the New York Jets, such as a field goal, three and out, interception, fumble, five plays, six plays, etc. and the predetermined number of possibilities may be set at seven. For example, for every start of a new drive or new possession, the wagering network may offer users odds for the number of plays that may occur during the drive as well as the possible result of the drive, with each result having different odds, such as the drive resulting in a touchdown at 20:1 odds. If there are not enough odds created for the predetermined number of possibilities in the drive results, then the drive begins module 126 may determine the wager odds for the next possibility, and the process may return to storing the wager odds in the odds database 122. For example, in the odds database 122, the odds for the drive to result in a touchdown are already stored, so the next possibility may be for the drive to result in a field goal. For example, if the Patriots had 100 drives with two minutes remaining in the first half versus the New York Jets and out of those 100 drives only ten times did the drive result in a field goal, then there may only be a 10% chance for the drive to result in a field goal, which the odds may be 100:10 or displayed to the user as 10:1 odds for the drive to result in a field goal. Since the predetermined number of possibilities is set at seven, then the drive begins module 126 may repeat this loop until the odds are calculated for the drive to result in a touchdown, field goal, three and out, interception, fumble, five plays, or six plays. In some embodiments, the predetermined number of possibilities may be set at any number, and seven is only used as an example. If there are enough odds created for the predetermined number of possibilities for the drive results, then the drive begins module 126 may send the drive result wager odds to the wagering app 110. For example, the drive result odds that are sent to the wagering app 110 may be that the New England Patriots drive ends with a touchdown, at 20:1 odds, results in a field goal, at 10:1 odds, results in a three and out, at 5:1 odds, etc. Then the drive begins module 126 may return to the base module 124.

It may be appreciated that the above example focuses on American football. However, in other examples, the drive begins module 126 (or possession begins module 126) may be utilized in any type of sporting event where there is an offensive player or team and a defensive player or team. For example, in baseball, a drive begins module 126 may be initiated upon the start of an inning for the batting team or any time during an inning for a batting team. In soccer or basketball, a drive begins module 126 may be initiated when a team has possession of the ball. It should be generally understood that the terms "drive" and "drive begins" as used general or with any specific embodiments or modules can be used interchangeably with "possession" or any situation where one team or player is on offense and an opposing team or player is on defense.

Further, embodiments may include a drive continuation module 128, which may begin with the drive continuation module 128 being initiated by the base module 124. Then the drive continuation module 128 may compare the upcoming play data to the odds database 122. For example, the drive continuation module 128 may compare the date of the event, the time of the event, the teams playing, the time within the event, and the players in the event to determine if there are current drive result odds available. For example, if the date is Sep. 8, 2020, the time of the event is 2:15 pm EST, the teams playing are the New England Patriots vs. the New York Jets, the time within the event is one minute and 50 seconds remaining, and the Patriots have possession of the ball at the New England 35-yard line then the odds database 122 may contain the record of drive result odds created during the process described in the drive begins module 126. The drive continuation module 128 may determine if there is an existing drive wager odds for the upcoming play. For example, the drive continuation module 128 may compare the date of the event, the time of the event, the teams playing, the time within the event, and the players in the event to determine if there are current drive wager or drive results odds available. For example, if the date is Sep. 8, 2020, the time of the event is 2:15 pm EST, the teams playing are the New England Patriots vs. the New York Jets, the time within the event is the two minutes remaining, and the Patriots have possession of the ball at the New England 25-yard line then the odds database 122 may contain the record of drive result odds created during the process described in the drive begins module 126. If there are no drive wager odds available in the odds database 122, then the drive continuation module 128 may return to the base module 124. For example, the drive continuation module 128 may return to the base module 124 to create the first drive result odds or drive wager odds. If there are drive result odds available in the odds database 122, then the drive continuation module 128 may extract the sequence odds from the odds database 122. For example, the data extracted may be the date is Sep. 8, 2020, the time of the event is 2:15 pm EST, the teams playing are the New England Patriots vs. the New York Jets, the time within the event is two minutes remaining, and the Patriots have the ball at the New England 25 yard line, with the drive result odds of the drive resulting in a touchdown, at 20:1 odds, resulting in a field goal, at 10:1 odds, resulting in a three and out, at 5:1 odds, etc. Then the drive continuation module 128 may determine if odds are created for the predetermined number of possibilities in the drive result. For example, a first down has occurred, so the odds of 5:1 for the drive to result in a three and out may no longer be available to the user and thus removed from the drive result odds, this may result in the drive result odds only containing six possibilities, and that may not meet the predetermined threshold of seven possibilities and the corresponding odds. If there are not enough odds created for the predetermined number of possibilities for the drive result odds, then the drive continuation module 128 may filter the historical plays database 118 on the upcoming play data. For example, the historical plays database 118 may be filtered for the New England Patriots vs. New York Jets event is in the second quarter with one minute and 50 seconds remaining, with New England having possession of the ball on the New England 35-yard line with a first down and ten yards to go. Then the drive continuation module 128 may extract the data from the historical plays database 118. For example, the drive continuation module 126 may extract all the historical wagering odds data associated with the event being the New England Patriots vs. New York Jets event is in the second quarter with one minute and 50 seconds remaining, with New England having possession of the ball on the New England 35-yard line with a first down and ten yards to go. The drive continuation module 128 may determine the wager odds for the next possibility for the drive results odds. For example, the odds for the drive to result in a touchdown, field goal, interception, fumble, five plays, and six plays may be stored in the odds database, so the drive continuation module may need to calculate the odds for the drive resulting in only seven plays. For example, if the Patriots had 100 drives versus the New York Jets and out of those 100 drives only once did the drive result in only seven plays, then there may only be a 1% chance for the drive to last seven plays, which the odds may be 100:1 or displayed to the user as 100:1 odds for the drive to last seven plays. In some embodiments, the drive results odds may be determined for the offensive team to achieve a first down and then from that first down perform three plays and punt. In some embodiments, the drive result odds may be recalculated using the same method for all drive result possibilities, such as touchdown, field goal, interception, fumble, five plays, and six plays. In some embodiments, the drive result odds may be recalculated on a play-by-play basis to calculate more accurate wagering odds. Then the drive continuation module 128 may store the drive result wager odds in the odds database 122. For example, the 100:1 odds for the drive to last seven plays may be stored with the current drive result odds in the odds database 122. If there are enough odds created for the predetermined number of possibilities for the drive results, then the drive continuation module 128 may send the drive result wager odds to the wagering app 110, and the process may return to the drive continuation module 128, returning to the base module 124. For example, the drive result odds that are sent to the wagering app 110 may that the New England Patriots drive resulting in a touchdown, at 20:1 odds, resulting in a field goal, at 10:1 odds, up to the drive lasting seven plays, at 100:1 odds.

FIG. 2 illustrates the base module 124. The process may begin with the base module 124 initiating; at step 200, the drive begins module 126. For example, the drive begins module 126 may begin with the base module 124, initiating the drive begins module 126. The drive begins module 126 may continuously poll for the upcoming play data from the live event 102. For example, the drive begins module 126 may continuously poll to receive the data from the live event 102 that represents the current state of the live event 102, such as in the New England Patriots vs. New York Jets event is in the second quarter with two minutes and zero seconds remaining, with New England having possession of the ball on the New England 25-yard line with a first down and ten yards to go. Then the drive begins module 126 may receive the upcoming play data from the live event 102. For example, the upcoming play data from the live event 102 that represents the current state of the live event 102 may be the New England Patriots vs. New York Jets event is in the second quarter, with New England having possession of the ball on the New England 25-yard line with a first down and ten yards to go. Then the drive begins module 126 may receive the time remaining from the live event 102. For example, the time remaining might be two minutes and zero seconds remaining in the second quarter. The drive begins module 126 may filter the historical plays database 118 on the upcoming play data. For example, the historical plays database 118 may be filtered for the New England Patriots vs. the New York Jets, with two minutes remaining on first down at the New England 25-yard line. Then the drive begins module 126, may extract the data from the historical plays database 118. For example, the drive begins module 126 may extract all the historical play data associated with the New England Patriots vs. the New York Jets, with two minutes remaining on first down at the New England 25-yard line. The drive begins module 126 may determine the wager odds. For example, the drive begins module 126 may determine the average wager odds from the odds of the historical wagers extracted from the historical plays database 118, such as if the number of times or occasions that the New England Patriots scored a touchdown vs. the New York Jets with two minutes remaining before the end of the first half. For example, if the Patriots had 100 drives versus the New York Jets with two minutes remaining before the end of the first half and out of those 100 drives only five times did the Patriots score a touchdown, then there may only be a 5% chance for the drive to result in a touchdown, which the odds may be 100:5 or displayed to the user as 20:1 odds for the drive to result in a touchdown. Then the drive begins module 126 may store the wager odds in the odds database 122 as drive results. For example, the wager odds 20:1 may be stored in the odds database 122 for the New England Patriots drive to result in a touchdown versus the New York Jets. Then the drive begins module 126 may determine if odds are created for a predetermined number of possibilities for the drive results. For example, there may need to be other odds calculated for the different drive results during the New England Patriots drive versus the New York Jets, such as a field goal, three and out, interception, fumble, five plays, six plays, etc. and the predetermined number of possibilities may be set at seven. For example, for every start of a new drive or new possession, the wagering network may offer users odds for the number of plays that may occur during the drive as well as the possible result of the drive, with each result having different odds, such as the drive resulting in a touchdown at 20:1 odds. If there are not enough odds created for the predetermined number of possibilities in the drive results, then the drive begins module 126 may determine the wager odds for the next possibility, and the process may return to storing the wager odds in the odds database 122. For example, in the odds database 122, the odds for the drive to result in a touchdown are already stored, so the next possibility may be for the drive to result in a field goal. For example, if the Patriots had 100 drives with two minutes remaining in the first half versus the New York Jets and out of those 100 drives only ten times did the drive result in a field goal, then there may only be a 10% chance for the drive to result in a field goal, which the odds may be 100:10 or displayed to the user as 10:1 odds for the drive to result in a field goal. Since the predetermined number of possibilities is set at seven, then the drive begins module 126 may repeat this loop until the odds are calculated for the drive to result in a touchdown, field goal, three and out, interception, fumble, five plays, or six plays. In some embodiments, the predetermined number of possibilities may be set at any number, and seven is only used as an example. If there are enough odds created for the predetermined number of possibilities for the drive results, then the drive begins module 126 may send the drive result wager odds to the wagering app 110. For example, the drive result odds that are sent to the wagering app 110 may be that the New England Patriots drive ends with a touchdown, at 20:1 odds, results in a field goal, at 10:1 odds, results in a three and out, at 5:1 odds, etc. Then the drive begins module 126 may return to the base module 124. Then the base module 124 may continuously poll, at step 202, for the upcoming play data from the live event 102. For example, the base module 124 may continuously poll to receive the data from the live event 102 that represents the current state of the live event 102, such as in the New England Patriots vs. New York Jets event is in the second quarter with one minute and 50 seconds remaining, with New England having possession of the ball on the New England 35-yard line with a first down and ten yards to go. Then the base module 124 may receive, at step 204, the upcoming play data from the live event 102. For example, the upcoming play data from the live event 102 that represents the current state of the live event 102 may be the New England Patriots vs. New York Jets event is in the second quarter with one minute and 50 seconds remaining, with New England having possession of the ball on the New England 35-yard line with a first down and ten yards to go. The base module 124 may determine, at step 206, if the offensive team got the first down. For example, the base module 124 may make this determination if the down resets to 1 if the previous down was one, two, or three, or if the same team has retained possession and the ball is placed or set ten yards further than the previous first down. If the team with possession of the ball has changed, for example, if the New England Patriots are no longer the offensive team and the New York Jets are now the offensive team, then the Patriots have failed to achieve a first down. If the offensive team has failed to achieve a first down, then the process may return to initiating the drive begins module 126. Then the base module 124 may initiate, at step 208, the drive continuation module 128. For example, if the New England Patriots have achieved a first down, then the base module 124 may initiate the drive continuation module 128. For example, the drive continuation module 128 may begin with the drive continuation module 128 being initiated by the base module 124. Then the drive continuation module 128 may compare the upcoming play data to the odds database 122. For example, the drive continuation module 128 may compare the date of the event, the time of the event, the teams playing, the time within the event, and the players in the event to determine if there are current drive result odds available. For example, if the date is Sep. 8, 2020, the time of the event is 2:15 pm EST, the teams playing are the New England Patriots vs. the New York Jets, the time within the event is one minute and 50 seconds remaining, and the Patriots have possession of the ball at the New England 35-yard line then the odds database 122 may contain the record of drive result odds created during the process described in the drive begins module 126. The drive continuation module 128 may determine if there is an existing drive wager odds for the upcoming play. For example, the drive continuation module 128 may compare the date of the event, the time of the event, the teams playing, the time within the event, and the players in the event to determine if there are current drive wager or drive results odds available. For example, if the date is Sep. 8, 2020, the time of the event is 2:15 pm EST, the teams playing are the New England Patriots vs. the New York Jets, the time within the event is the two minutes remaining, and the Patriots have possession of the ball at the New England 25-yard line then the odds database 122 may contain the record of drive result odds created during the process described in the drive begins module 126. If there are no drive wager odds available in the odds database 122, then the drive continuation module 128 may return to the base module 124. For example, the drive continuation module 128 may return to the base module 124 to create the first drive result odds or drive wager odds. If there are drive result odds available in the odds database 122, then the drive continuation module 128 may extract the sequence odds from the odds database 122. For example, the data extracted may be the date is Sep. 8, 2020, the time of the event is 2:15 pm EST, the teams playing are the New England Patriots vs. the New York Jets, the time within the event is two minutes remaining, and the Patriots have the ball at the New England 25 yard line, with the drive result odds of the drive resulting in a touchdown, at 20:1 odds, resulting in a field goal, at 10:1 odds, resulting in a three and out, at 5:1 odds, etc. Then the drive continuation module 128 may determine if odds are created for the predetermined number of possibilities in the drive result. For example, a first down has occurred, so the odds of 5:1 for the drive to result in a three and out may no longer be available to the user and thus removed from the drive result odds. This may result in the drive result odds only containing six possibilities, and that may not meet the predetermined threshold of seven possibilities and the corresponding odds. If there are not enough odds created for the predetermined number of possibilities for the drive result odds, then the drive continuation module 128 may filter the historical plays database 118 on the upcoming play data. For example, the historical plays database 118 may be filtered for the New England Patriots vs. New York Jets event is in the second quarter with one minute and 50 seconds remaining, with New England having possession of the ball on the New England 35-yard line with a first down and ten yards to go. Then the drive continuation module 128 may extract the data from the historical plays database 118. For example, the drive continuation module 126 may extract all the historical wagering odds data associated with the event being the New England Patriots vs. New York Jets event is in the second quarter with one minute and 50 seconds remaining, with New England having possession of the ball on the New England 35-yard line with a first down and ten yards to go. The drive continuation module 128 may determine the wager odds for the next possibility for the drive results odds. For example, the drive result odds for the drive to result in a touchdown, field goal, interception, fumble, five plays, and six plays may be stored in the odds database, so the drive continuation module may need to calculate the odds for the drive resulting in only seven plays. For example, if the Patriots had 100 drives versus the New York Jets and out of those 100 drives only once did the drive result in only seven plays, then there may only be a 1% chance for the drive to last seven plays, which the odds may be 100:1 or displayed to the user as 100:1 odds for the drive to last seven plays. In some embodiments, the drive results odds may be determined for the offensive team to achieve a first down and then from that first down perform three plays and punt. In some embodiments, the drive result odds may be recalculated using the same method for all drive result possibilities, such as touchdown, field goal, interception, fumble, five plays, and six plays. In some embodiments, the drive result odds may be recalculated on a play-by-play basis to calculate more accurate wagering odds. Then the drive continuation module 128 may store the drive result wager odds in the odds database 122. For example, the 100:1 odds for the drive to last seven plays may be stored with the current drive result odds in the odds database 122. If there are enough odds created for the predetermined number of possibilities for the drive results, then the drive continuation module 128 may send the drive result wager odds to the wagering app 110, and the process may return to the drive continuation module 128, returning to the base module 124. For example, the drive result odds that are sent to the wagering app 110 may that the New England Patriots drive resulting in a touchdown, at 20:1 odds, resulting in a field goal, at 10:1 odds, up to the drive lasting seven plays, at 100:1 odds.

FIG. 3 illustrates the drive begins module 126. The process may begin with the base module 124 initiating; at step 300, the drive begins module 126. The drive begins module 126 may continuously poll, at step 302, for the upcoming play data from the live event 102. For example, the drive begins module 126 may continuously poll to receive the data from the live event 102 that represents the current state of the live event 102, such as in the New England Patriots vs. New York Jets event is in the second quarter with two minutes and zero seconds remaining, with New England having possession of the ball on the New England 25-yard line with a first down and ten yards to go. Then the drive begins module 126 may receive, at step 304, the upcoming play data from the live event 102. For example, the upcoming play data from the live event 102 that represents the current state of the live event 102 may be the New England Patriots vs. New York Jets event is in the second quarter, with New England having possession of the ball on the New England 25-yard line with a first down and ten yards to go. Then the drive begins module 126 may receive, at step 306, the time remaining from the live event 102. For example, the time remaining might be two minutes and zero seconds remaining in the second quarter. The drive begins module 126 may filter, at step 308, the historical plays database 118 on the upcoming play data. For example, the historical plays database 118 may be filtered for the New England Patriots vs. the New York Jets, with two minutes remaining on first down at the New England 25-yard line. Then the drive begins module 126 may extract, at step 310, the data from the historical plays database 118. For example, the drive begins module 126 may extract all the historical play data associated with the New England Patriots vs. the New York Jets, with two minutes remaining on first down at the New England 25-yard line. The drive begins module 126 may determine, at step 312, the wager odds. For example, the drive begins module 126 may determine the average wager odds from the odds of the historical wagers extracted from the historical plays database 118, such as if the number of times or occasions that the New England Patriots scored a touchdown vs. the New York Jets with two minutes remaining before the end of the first half. For example, if the Patriots had 100 drives versus the New York Jets with two minutes remaining before the end of the first half and out of those 100 drives only five times did the Patriots score a touchdown, then there may only be a 5% chance for the drive to result in a touchdown, which the odds may be 100:5 or displayed to the user as 20:1 odds for the drive to result in a touchdown. Then the drive begins module 126 may store: at step 314, the wager odds in the odds database 122 as a drive result. For example, the wager odds 20:1 may be stored in the odds database 122 for the New England Patriots drive to result in a touchdown versus the New York Jets. Then the drive begins module 126 may determine, at step 316, if odds are created for a predetermined number of possibilities for the drive results. For example, there may need to be other odds calculated for the different drive results during the New England Patriots drive versus the New York Jets, such as a field goal, three and out, interception, fumble, five plays, six plays, etc. and the predetermined number of possibilities may be set at seven. For example, for every start of a new drive or new possession, the wagering network may offer users odds for the number of plays that may occur during the drive as well as the possible result of the drive, with each result having different odds, such as the drive resulting in a touchdown at 20:1 odds. If there are not enough odds created for the predetermined number of possibilities in the drive results, then the drive begins module 126 may determine, at step 318, the wager odds for the next possibility, and the process may return to storing the wager odds in the odds database 122, at step 314. For example, in the odds database 122, the odds for the drive to result in a touchdown are already stored, so the next possibility may be for the drive to result in a field goal. For example, if the Patriots had 100 drives with two minutes remaining in the first half versus the New York Jets and out of those 100 drives only ten times did the drive result in a field goal, then there may only be a 10% chance for the drive to result in a field goal, which the odds may be 100:10 or displayed to the user as 10:1 odds for the drive to result in a field goal. Since the predetermined number of possibilities is set at seven, then the drive begins module 126 may repeat this loop until the odds are calculated for the drive to result in a touchdown, field goal, three and out, interception, fumble, five plays, or six plays. In some embodiments, the predetermined number of possibilities may be set at any number, and seven is only used as an example. If there are enough odds created for the predetermined number of possibilities for the drive results, then the drive begins module 126 may send, at step 320, the drive result wager odds to the wagering app 110. For example, the drive result odds that are sent to the wagering app 110 may be that the New England Patriots drive ends with a touchdown, at 20:1 odds, results in a field goal, at 10:1 odds, results in a three and out, at 5:1 odds, etc. Then the drive begins module 126 may return, at step 322, to the base module 124.

FIG. 4 illustrates the drive continuation module 128. The process may begin with the drive continuation module 128 being initiated, at step 400, by the base module 124. Then the drive continuation module 128 may compare, at step 402, the upcoming play data to the odds database 122. For example, the drive continuation module 128 may compare the date of the event, the time of the event, the teams playing, the time within the event, and the players in the event to determine if there are current drive result odds available. For example, if the date is Sep. 8, 2020, the time of the event is 2:15 pm EST, the teams playing are the New England Patriots vs. the New York Jets, the time within the event is one minute and 50 seconds remaining, and the Patriots have possession of the ball at the New England 35-yard line then the odds database 122 may contain the record of drive result odds created during the process described in the drive begins module 126. The drive continuation module 128 may determine, at step 404, if there is an existing drive wager odds for the upcoming play. For example, the drive continuation module 128 may compare the date of the event, the time of the event, the teams playing, the time within the event, and the players in the event to determine if there are current drive wager or drive results odds available. For example, if the date is Sep. 8, 2020, the time of the event is 2:15 pm EST, the teams playing are the New England Patriots vs. the New York Jets, the time within the event is the two minutes remaining, and the Patriots have possession of the ball at the New England 25-yard line then the odds database 122 may contain the record of drive result odds created during the process described in the drive begins module 126. If there are no drive wager odds available in the odds database 122, then the drive continuation module 128 may return, at step 406, to the base module 124. For example, the drive continuation module 128 may return to the base module 124 to create the first drive result odds or drive wager odds. If there are drive result odds available in the odds database 122, then the drive continuation module 128 may extract, at step 408, the sequence odds from the odds database 122. For example, the data extracted may be the date is Sep. 8, 2020, the time of the event is 2:15 pm EST, the teams playing are the New England Patriots vs. the New York Jets, the time within the event is two minutes remaining, and the Patriots have the ball at the New England 25 yard line, with the drive result odds of the drive resulting in a touchdown, at 20:1 odds, resulting in a field goal, at 10:1 odds, resulting in a three and out, at 5:1 odds, etc. Then the drive continuation module 128 may determine, at step 410, if odds are created for the predetermined number of possibilities in the drive result. For example, a first down has occurred, so the odds of 5:1 for the drive to result in a three and out may no longer be available to the user and thus removed from the drive result odds, this may result in the drive result odds only containing six possibilities, and that may not meet the predetermined threshold of seven possibilities and the corresponding odds. If there are not enough odds created for the predetermined number of possibilities for the drive result odds, then the drive continuation module 128 may filter, at step 412, the historical plays database 118 on the upcoming play data. For example, the historical plays database 118 may be filtered for the New England Patriots vs. New York Jets event is in the second quarter with one minute and 50 seconds remaining, with New England having possession of the ball on the New England 35-yard line with a first down and ten yards to go. Then the drive continuation module 128 may extract, at step 414, the data from the historical plays database 118. For example, the drive continuation module 126 may extract all the historical wagering odds data associated with the event being the New England Patriots vs. New York Jets event is in the second quarter with one minute and 50 seconds remaining, with New England having possession of the ball on the New England 35-yard line with a first down and ten yards to go. The drive continuation module 128 may determine, at step 416, the wager odds for the next possibility for the drive results odds. For example, the odds for the drive to result in a touchdown, field goal, interception, fumble, five plays, and six plays may be stored in the odds database, so the drive continuation module may need to calculate the odds for the drive resulting in only seven plays. For example, if the Patriots had 100 drives versus the New York Jets and out of those 100 drives only once did the drive result in only seven plays, then there may only be a 1% chance for the drive to last seven plays, which the odds may be 100:1 or displayed to the user as 100:1 odds for the drive to last seven plays. In some embodiments, the drive results odds may be determined for the offensive team to achieve a first down and then from that first down perform three plays and punt. In some embodiments, the drive result odds may be recalculated using the same method for all drive result possibilities, such as touchdown, field goal, interception, fumble, five plays, and six plays. In some embodiments, the drive result odds may be recalculated on a play-by-play basis to calculate more accurate wagering odds. Then the drive continuation module 128 may store, at step 418, the drive result wager odds in the odds database 122. For example, the 100:1 odds for the drive to last seven plays may be stored with the current drive result odds in the odds database 122. If there are enough odds created for the predetermined number of possibilities for the drive results, then the drive continuation module 128 may send, at step 420, the drive result wager odds to the wagering app 110, and the process may return to the drive continuation module 128 returning to the base module 124. For example, the drive result odds that are sent to the wagering app 110 may that the New England Patriots drive resulting in a touchdown, at 20:1 odds, resulting in a field goal, at 10:1 odds, up to the drive lasting seven plays, at 100:1 odds.

The foregoing description and accompanying figures illustrate the principles, preferred embodiments, and modes of operation of the invention. However, the invention should not be construed as being limited to the embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A computer implemented method to generate and display odds, comprising executing on a processor the steps of:

determining, with the processor, at least one set of wagering odds for a live event using historical play data;

determining, with the processor, a predetermined number of possibilities for at least a possession wager or a possession result;

determining, with the processor, that either a set of possession wager odds or a set of possession result odds are available;

sending, with the processor, at least the predetermined number of possibilities for at least the possession wager or the possession result to a wagering application; and displaying, on a gaming device, a set of wagering odds which dynamically update to display a predetermined number of wagering odds at an end of an action in the live event.

2. The computer implemented method to generate and display odds of claim 1, wherein a possession further comprises at least one of an outcome based on an action of a team that has possession of a ball in the live event or at least one play occurring after the team obtains possession of the ball in the live event.

3. The computer implemented method to generate and display odds of claim 1, further comprising:

leveraging, with the processor, at least one of game data, ball possession data, and team data to determine that a team is playing offense.

4. The computer implemented method to generate and display odds of claim 1, further comprising:

utilizing, with the processor at least one of date data, time data, team data, player data, and event data to determine that the set of possession wager odds or the set of possession result odds are available.

5. The computer implemented method to generate and display odds of claim 1, wherein the predetermined number of possibilities is set by at least an administrator or a module.

6. The computer implemented method to generate and display odds of claim 1, further comprising:

sending, with the processor, the predetermined number of possibilities for the possession wager or the possession result through at least a notification, a banner, a text message, or a pop-up.

7. A system, comprising:

a base module configured to:

continuously poll for play data from a live event, receive the play data from the live event;

a possession begins module, initiated by the base module, wherein the possession begins module is configured to:

continuously poll for upcoming play data from the live event, receive the upcoming play data and remaining time from the live event, filter a historical plays database for the upcoming play data and the remaining time, extract historical play data from the historical plays database, determine, with the processor, wager odds for a first possession result, store the wager odds in an odds database, determine, with the processor, odds for a predetermined number of possibilities for the first possession result, and send the first possession result to a wagering application;

a possession continuation module, initiated by the base module, wherein the possession continuation module is configured to:

compare the upcoming play data with the odds database, determine a current set of possession wager odds, determine, with the processor, wager odds for the predetermined number of possibilities for the first possession result, filter the historical plays database for the upcoming play data and the remaining time, extract the historical play data from the historical plays database, recalculate, with the processor, drive result odds on a play-by-play basis and wager odds for a next possibility for the first possession result, store a set of wager odds in the odds database, and send the first possession result to a wagering application;

a graphical display configured to:

display a set of wagering odds which dynamically update to display a predetermined number of wagering odds at an end of a play in the live event.

8. The system of claim 7, wherein the possession begins module is further configured to determine, with the processor, at least additional wager odds for at least a next possibility for a possession result after the amount of odds does not meet the predetermined number of possibilities.

9. The system of claim 7, wherein the predetermined number of possibilities is set by at least an administrator or a module.

* * * * *